United States Patent
Grasselt et al.

(10) Patent No.: US 9,697,066 B2
(45) Date of Patent: Jul. 4, 2017

(54) METHOD FOR PROCESSING DATA QUALITY EXCEPTIONS IN A DATA PROCESSING SYSTEM

(71) Applicant: International Business Machines Corporation, Armonk, NY (US)

(72) Inventors: Mike Grasselt, Leinfelden-Echterdingen (DE); Albert Maier, Tuebingen (DE); Sergej Schuetz, Boblingen (DE); Thomas Schwarz, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 14/669,410

(22) Filed: Mar. 26, 2015

(65) Prior Publication Data

US 2016/0011926 A1  Jan. 14, 2016

(30) Foreign Application Priority Data

Jul. 8, 2014  (GB) .................................. 1412121.4

(51) Int. Cl.
G06F 9/44 (2006.01)
G06F 11/07 (2006.01)
G06F 17/30 (2006.01)

(52) U.S. Cl.
CPC ...... *G06F 11/0769* (2013.01); *G06F 11/0787* (2013.01); *G06F 17/30303* (2013.01)

(58) Field of Classification Search
None
See application file for complete search history.

(56) References Cited

U.S. PATENT DOCUMENTS 7,251,578 B1  7/2007  Chen et al.
7,844,641 B1  11/2010  Sengupta et al.
(Continued)

FOREIGN PATENT DOCUMENTS

CN  102629223 A  8/2012
GB  2528066 A  1/2016
(Continued)

OTHER PUBLICATIONS

International Searching Authority, "Notification of Transmittal of the International Search Report and the Written Opinion of the International Searching Authority, or the Declaration," Patent Cooperation Treaty, Nov. 27, 2015, 13 Pages, International Application No. PCT/IB2015/055128.

(Continued)

*Primary Examiner* — Chuck Kendall
(74) *Attorney, Agent, or Firm* — Patricia B. Feighan

(57) ABSTRACT

The present invention relates to a method for processing data quality exceptions in a data processing system, the data processing system having access to one or more data sources and having access to multiple technical support systems, the multiple technical support systems having one or more predefined technical tasks. The method comprises providing a predefined grouping rule for assigning data quality exceptions to exception groups, and associating each exception group using at least one technical task; receiving a first description of at least a first data quality exception in a data set of the first data source; using the grouping rule for assigning the first data quality exception to at least a first exception group using the first description, and for associating the first exception group with a first technical support system; routing by the exception engine at least part of the first description to the first technical support system.

18 Claims, 4 Drawing Sheets

(56) References Cited

U.S. PATENT DOCUMENTS

| | | | |
|---|---|---|---|
| 8,666,919 | B2 | 3/2014 | Miranda et al. |
| 8,688,625 | B1 | 4/2014 | Clark et al. |
| 8,751,438 | B2 | 6/2014 | Kharod et al. |
| 2004/0264650 | A1 | 12/2004 | Wright et al. |
| 2007/0179833 | A1 | 8/2007 | Moorthy et al. |
| 2008/0021822 | A1* | 1/2008 | Hinton .................. G06Q 10/10 705/40 |
| 2011/0055620 | A1 | 3/2011 | Sengupta |
| 2012/0159133 | A1 | 6/2012 | Talwar et al. |
| 2012/0330911 | A1 | 12/2012 | Gruenheid et al. |
| 2013/0086010 | A1 | 4/2013 | Wenzel et al. |
| 2013/0268494 | A1 | 10/2013 | Tahiliani et al. |
| 2013/0275170 | A1 | 10/2013 | Kern et al. |
| 2013/0275393 | A1 | 10/2013 | Kaldas et al. |
| 2013/0275803 | A1 | 10/2013 | Kern et al. |
| 2014/0025625 | A1 | 1/2014 | Erla et al. |
| 2014/0025645 | A1 | 1/2014 | Brown et al. |
| 2014/0279835 | A1 | 9/2014 | Li et al. |
| 2015/0113323 | A1 | 4/2015 | Hui et al. |
| 2016/0092290 | A1 | 3/2016 | Gerstl et al. |

FOREIGN PATENT DOCUMENTS

| | | |
|---|---|---|
| WO | 2013187816 A1 | 12/2013 |
| WO | 2016005898 A1 | 1/2016 |

OTHER PUBLICATIONS

Application No. 1412121.4 (United Kingdom), titled "A method for processing data quality exceptions in a data processing system," filed Jul. 8, 2014, 40 pages.

SAP Software Solutions, "SAP End-to-End Exception Management," A White Paper, http://wiki.scn.sap.com/wiki/download/attachments/283836690/WhitePaper_E2E_ExcMgmt.pdf?version=1&modificationDate=1338471868000&api=v2, 4 pages.

TIQ Solutions, "Rule-based measurement of data quality—simple, efficient, quality-assured," http://www.tiq-solutions.de/download/attachments/4227780/TIQRules_rule-based-data-quality.pdf, 2 pages.

Infosys Limited, "Next Generation Exception Management, 2011," http://www.infosys.com/industries/financial-services/Documents/Infosys-IEMS-V1.pdf, 2 pages.

Oracle®, "Oracle® Enterprise Data Quality for Product Data," Release 11g R1, Feb. 2013, http://docs.oracle.com/cd/E35636_01/doc.11116/e35635/pdget.htm, Accessed on Mar. 24, 2015, pp. 1-14.

Talend, "Data Profiling; Why Wait to Start Your Data Profiling Project?", http://www.talend.com/resource/data-profiling.html, Accessed on Mar. 24, 2015, pp. 1-5.

Disclosed Anonymously, "A Method and System for Root Cause Analysis of Change Requests At Aggregate Levels of Project Development and Management," IP.com Electronic Publication No. IPCOM000228067D, Jun. 4, 2013, 4 pages.

* cited by examiner

METHOD FOR PROCESSING DATA QUALITY EXCEPTIONS IN A DATA PROCESSING SYSTEM

BACKGROUND

The invention relates to computing systems, and more particularly to a method for processing data quality exceptions.

Many data processes in data processing systems depend on a good quality of the data they are working with. For example, there are data processes that might only run successfully if data values comply with an expected format. However, establishing a sufficient data quality level is a significant challenge during data integration projects and many data processing projects may fail to fulfill their goals because they are not able to address this aspect sufficiently.

SUMMARY

It is an objective of embodiments of the invention to provide for an improved method for processing data quality exceptions, an exception engine and a computer program product. Said objective is solved by the subject matter of the independent claims. Advantageous embodiments are described in the dependent claims.

In one aspect, the invention relates to a method for processing data quality exceptions in a data processing system, the data processing system having access to one or more data sources, the data processing system further having access to multiple technical support systems for providing technical repairs of the data quality exceptions, the multiple technical support systems having one or more predefined technical tasks. The method comprises providing a predefined grouping rule for assigning data quality exceptions to exception groups, and associating to each exception group using at least one technical task of the one or more predefined technical tasks with a technical support system of the multiple technical support systems responsible for providing technical repairs of exceptions in the exception group; receiving, by an exception engine of the data processing system, from at least a first data source of the one or more data sources a first description of at least a first data quality exception in a data set of the first data source; using (or applying) the grouping rule for assigning the first data quality exception to at least a first exception group using the first description, and for associating using a first technical task of the one or more technical tasks the first exception group with a first technical support system of the multiple technical support systems; routing by the exception engine at least part of the first description to the first technical support system for providing a technical repair for exceptions in the first exception group.

In another aspect, the invention relates to a computer program product comprising computer executable instructions to perform the method steps of the method of any one of the preceding claims.

In another aspect, the invention relates to an exception engine for processing data quality exceptions in a data processing system, the data processing system having access to one or more data sources, the data processing system further having access to multiple technical support systems for providing technical repairs of the data quality exceptions, the multiple technical support systems having one or more predefined technical tasks, wherein a predefined grouping rule is provided for assigning data quality exceptions to exception groups, and associating to each exception group using at least one technical task of the one or more predefined technical tasks with a technical support system of the multiple technical support systems responsible for providing technical repairs of exceptions in the exception group. The exception engine is configured for receiving from at least a first data source of the one or more data sources a first description of at least a first data quality exception in a data set of the first data source; using the grouping rule for assigning the first data quality exception to at least a first exception group using the first description, and for associating using a first technical task of the one or more technical tasks the first exception group with a first technical support system of the multiple technical support systems; routing at least part of the first description to the first technical support system for providing a technical repair for exceptions in the first exception group.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

Figure 1:
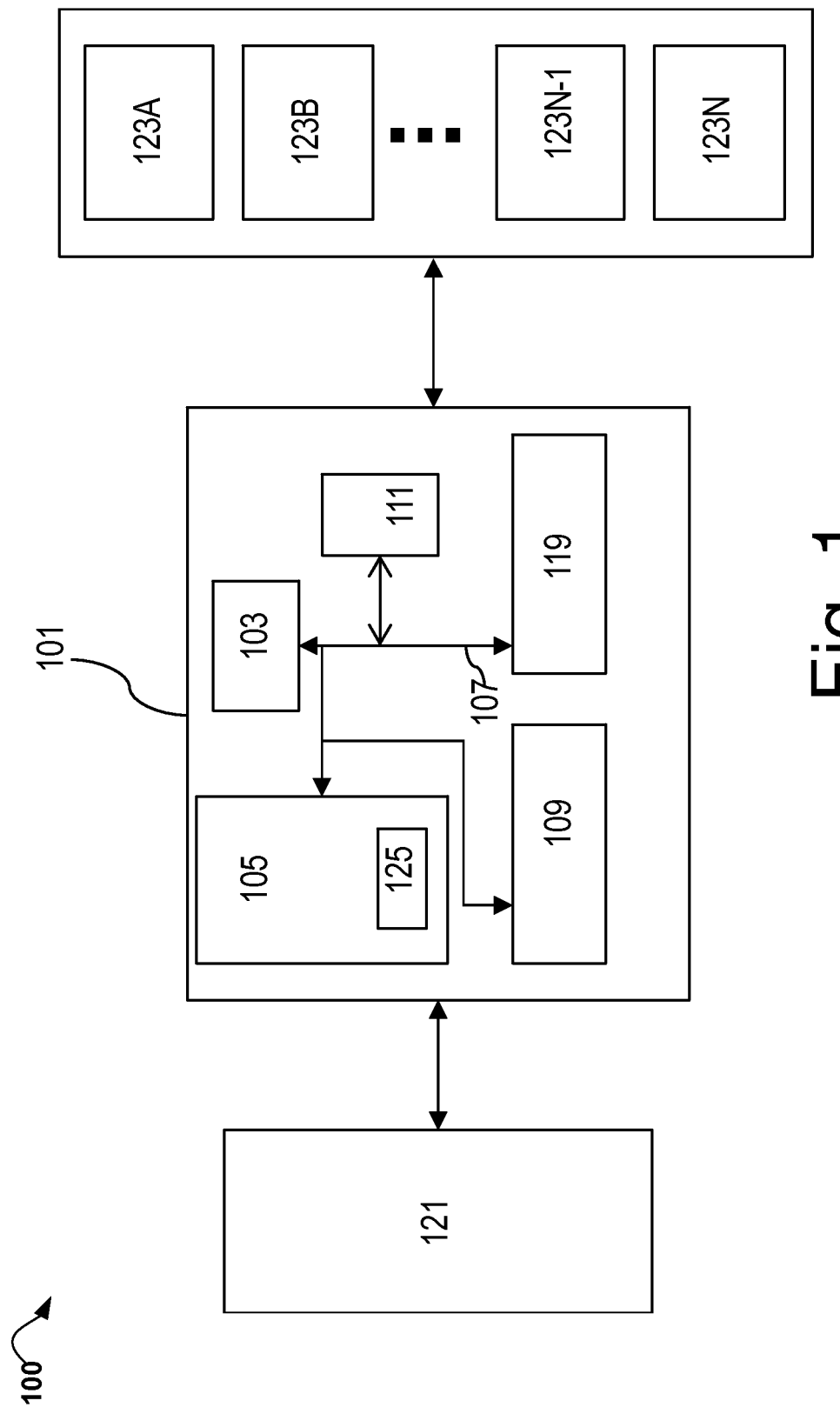
FIG. 1 illustrates an exemplary data processing system for processing data quality exceptions.

In the following, like numbered elements in the figures either designate similar elements or designate elements that perform an equivalent function. Elements which have been discussed previously will not necessarily be discussed in later figures if the function is equivalent.

The data source as described above may comprise a computer or storage server for storing, processing and/or transmitting data.

The data set may comprise at least one of data entries, files, tables, metadata of data, software application files etc.

The term "data quality exception" as used herein encompasses a data quality error or issue (such as unexpected or unspecified values) that may relate to the content and/or format of the data set. The data quality exception may indicate, for example, duplicate data in the data set, a non-supported old version of a software application in the data set, incorrect or invalid values in the data set, missing values in the data set etc.

A technical task may comprise an indication of the data quality exceptions for which a given technical support system may provide a technical repair. For example, the technical task may indicate that a technical support system having that technical task may provide technical repairs of data quality exceptions that occur in a data set located in a predefined location and/or occurred at a predefined time interval. In another example, the technical task may indicate that a technical support system having that technical task may provide technical repairs of software related data quality exceptions.

The first description may comprise first exception attribute values describing the first data quality exception. The first exception attribute may comprise a time, a version number, a number of occurrences of a value etc. The grouping rule may comprise a predefined condition on at least part of the first exception attribute values. The grouping rule may take into account the available technical tasks as it may further comprise a condition on an attribute value of the first technical task. For example, the attribute value of the first technical task may comprise "location of data to be treated by a technical support system", and the grouping rule may comprise a condition on that attribute value such as "location=Europe".

For example, if only a single technical task can be supported by the technical support systems, the exception engine may create an exception group accordingly such that only data quality exceptions that can be fixed by that technical support system are selected/grouped in the exception group.

The routing of the first description may be performed using routing information. The routing information comprises an identification address of the first technical support system. The identification address may comprise an IP address, a Fiber Channel address, or an URL.

The technical repair may comprise instructions for fixing the first data quality exception in the data set. The technical repair may be applied by a user of the data source and/or the technical support system.

An exception group as used herein refers to a computer file and/or a data table comprising at least part of the description of each of the data quality exceptions that are assigned to the exception group.

Assigning data quality exceptions to exception groups is performed after the exception groups are created. For example, as soon as a data quality exception is received it is assigned to an exception group of the exception groups by for example inserting at least part of the description of the data quality exception into the exception group being e.g. a file and/or a data table.

For example, the first data quality exception may affect at least part of the data set. For example, the data set may comprise multiple data entries stored on different locations and the at least part of the data set may comprise data entries stored in a given location e.g. Europe.

The features of the disclosed method may have the advantage of providing an automatic method for fixing data quality exceptions in an efficient manner by assigning the right data quality exception to the right technical support system. This may save resources in the data processing system that would otherwise be required for performing the iteration between the technical support systems and the exception engine in order to find the right technical support system that may solve the data quality exception. This is particularly advantageous in case of large data processing systems e.g. in cloud systems where many data sources exist and the amount of data exceptions that are detected is relatively high.

Another advantage may be that the capacity of the data processing system may increase by providing more valuable data, serving more users and/or providing additional services. This may overcome poor quality of service (QoS) that may result in these processing systems due to non-optimal fixing of the data quality exceptions. This may maintain a continuous and QoS-guaranteed service.

Another advantage may be that the present method may be seamlessly integrated in existing systems comprising exception providers and technical support systems. It may be implemented with a low software and/or hardware burden.

Another advantage may reside in the fact that the present method may speed-up the process of fixing or correcting of data quality exceptions by, for example, avoiding to assign the data quality exception to the wrong technical support.

Another advantage may be that the data set may be protected as it is not transferred to the technical support systems but only exception descriptions are sent to the technical support systems.

According to one embodiment, associating the first exception group with the first technical support system comprises sending a request to the data source for obtaining an indication of first data entries of the data set affected by the first data quality exception and that correspond to the first technical task; receiving a response message to the request, the response indicating the first data entries. For example, the response may indicate that number of the first data entries e.g. being higher than zero.

"The first data entries correspond to the first technical task" means that the first technical support system can provide a technical repair for the first data quality exception that affects the first data entries. For example, if the first technical task indicates that the first technical support system can provide technical repairs for data quality exceptions that occur on data sets located in Europe, then the first data entries correspond to the first technical support system if they are located in Europe.

This embodiment may have the advantage of providing an accurate association between the exceptions and the technical support systems.

According to one embodiment, associating the first exception group with the first technical support system is performed using the first description, wherein the first description comprises an indication of first data entries (e.g. the number of the first data entries) of the data set affected by the first data quality exception and that correspond to the first technical task.

According to one embodiment, associating the first exception group with the first technical support system comprises providing a map describing correspondence between exception groups and the one or more technical tasks; selecting using the map and the first description the first technical task that matches the first exception group, wherein the first technical support system has the first technical task.

The map may comprise a database table having multiple entries, wherein an entry of the entries indicates an exception group and at least one associated or corresponding technical task. The map may be a predefined map.

The first technical support system may comprise the technical support system having the lowest load of the technical support systems having the same first technical task. In an alternative example, the first technical support system may be randomly selected from a list of the technical support systems having the first technical task.

In an alternative example, the selecting of the first technical support system may be performed using historical data indicative of the functional statuses of the technical support systems. For example, the exception engine may determine that a given technical support system having a given technical task usually fixes or provides technical repairs for data quality exceptions that happen or occur in a predefined location and which are similar to the exceptions of the exception group.

This embodiment may be advantageous as it may further optimize the assignment of the exception groups to the right technical support systems.

According to one embodiment, the method further comprises using (or applying) the grouping rule for assigning the first data quality exception to a second exception group using the first description, and for associating using a second technical task of the one or more technical tasks the second exception group with a second technical support system of the multiple technical support systems; sending a request to the data source for obtaining an indication of data entries of the data set affected by the first data quality exception and that correspond to the second technical task; receiving a response indicative of zero entries in response to the request; preventing routing by the exception engine at least part of the first description to the second technical support system for providing a technical repair for exceptions in the second exception group. For example, the first data quality exception may be removed from the second exception group. This may prevent the transfer of data quality exceptions and may thus reduce the traffic load.

According to one embodiment, the method further comprises before the routing is performed receiving from a second data source of the data processing system a second description of a second data quality exception in a data set of the second data source; using the grouping rule for assigning the second data quality exception to the first exception group using the second description, wherein routing comprises routing by the exception engine at least part of the first description and the second description to the first technical support system. The first exception group is already associated with the first technical support system when the first data quality exception is received and assigned to the first exception group. The first exception group comprises at least the first and second data quality exceptions. The routing may be performed such that the first technical support system may provide technical repairs for at least the first and second data quality exceptions.

This embodiment may be advantageous as it may save processing resources that would otherwise be required for the individual treating and/or transmission of the data quality exceptions. It may reduce the data traffic. For example, instead of individually transferring the first and second data quality exceptions to the first technical support system they are transferred only at once.

According to one embodiment, the grouping rule comprises conditions on at least part of the first description and the first technical task. For example, the first description may indicate first exceptions attribute values (e.g. the location of the data set) describing the first data quality exception, and the condition may comprise "if the first attribute value is within a given range then the first data quality exception may be assigned to the first exception group". The condition on the first technical task may be for example "the first technical task indicates that the first technical support system can provide technical repairs for data sets affected by the first data quality exception and located in Europe".

According to one embodiment, the method further comprises before performing the routing receiving from a second data source of the processing system a second description of at least a second data quality exception in a data set of the second data source, wherein the first and second descriptions indicate first and second exceptions attribute values describing the first and second data quality exceptions respectively, using the grouping rule for assigning the second data quality exception to the first exception group using the second description; evaluating the first and second exception attribute values and therefrom determining a dependency exception attribute relating the first and second exception attributes; determining a root data quality exception associated with the dependency exception attribute; providing a description of the root data quality exception using the first and second descriptions, wherein routing comprises routing by the exception engine at least part of the description to the first technical support system for providing a technical repair for the root data quality exception, thereby providing the technical repair for the first and second data quality exceptions.

By providing the technical repair for the root data quality exception, the technical repair is provided to the exceptions of first exception group in the sense that they may be corrected by the technical repair provided for the root data quality exception.

For example, in case the first and second data quality exceptions relate to an old non-supported version of a first and a second application respectively, the root data quality exception may be the version of the operating system OS used in the data source on which the first and second applications run. In this case, a correction or fix of the version of the OS version would fix the first and second data quality exceptions.

This embodiment may have the advantage of further reducing the traffic load in the data processing systems by limiting data transmitted to the technical support systems.

Another advantage may be the reduction of the processing load in the data processing system that may be caused by the treatment of several data quality exceptions that may have the same cause. This may help to avoid overloading the technical support systems, e.g. as it may avoid to create millions of data quality issue tasks for technical support systems.

Another advantage may be avoiding future data quality exceptions that have the same root data quality exception.

According to one embodiment, the method further comprises determining that the number of exceptions in the first exception group is higher than a predetermined maximum number of data quality exceptions.

According to one embodiment, the method further comprises configuring the data source to provide the first description in a predefined format in order to perform the assigning of the first data quality exception to the first exception group using the first description in the predefined format.

For example, the predefined format may comprise the content of the first description and/or the format in which the content of the first description is encoded e.g. the classification may work or be applied only on version numbers encoded as "x-y.z", or on float numbers encoded as "x.yyyy" with 4 decimals. Also, the first description may contain the number of data entries that are affected by the first data quality exception and their associated technical task of the one more technical tasks. For example, the first description may indicate N data entries of the data set that are affected by the first data quality exception and their corresponding technical task that indicates that a technical support system can solve the first data quality exception for those N data entries e.g. because the technical support system is responsible for solving exceptions in a given location where the N data entries are stored. The first description may further indicate that M data entries of the data set their corresponding technical task that indicates that a technical support system can solve the first data quality exception for those M data entries e.g. because the technical support system is responsible for solving exceptions that are related to the data format (here the first data quality exception may relate to the data format of the N and M data entries).

According to one embodiment, the first description comprises at least one of: an indication of the data set; the time at which the first data quality exception occurs in the first data source; the amount of data in the data set affected by the first data quality exception; an exception detection algorithm that is used to detect (or identify) the first data quality exception; a data type of the data set; a technical description of the first data quality exception; an indication of the last modification time in the data set.

According to one embodiment, the method further comprises determining the number of data entries of the data set affected by the first data quality exception; determining that the number of data entries is higher than a predetermined maximum number of entries; splitting the first exception group into at least two exception sub-groups; and associating using the first technical task the at least two exception sub-groups with at least the first technical support system; generating a description for each of the at least two exception sub-groups; routing the descriptions to at least the first technical support system for providing a technical repair for the at least two exception sub-groups.

For example, the at least two exception sub-groups may be associated with the first technical support system and a second technical support system such that they can be executed (i.e. technical repairs provided) in parallel.

This embodiment may have the advantage of controlling the load on the technical support systems.

According to one embodiment, the method further comprises repeating the routing on a periodic basis at a predefined time interval. For example, during the time interval the exception engine may receive multiple data quality exceptions that may be assigned to multiple exception groups.

According to one embodiment, each of the first data source and the first technical support system comprises an end-host system of a network of the data processing system. The data sources and the technical support systems may belong to the data processing system, or the data processing system may provide access to the source systems and technical support systems e.g. via networks.

The term "end-host" refers to a computer that is typically not considered as an intermediary node in a network of the data processing system. For example, an end-host may be a client machine, a server, and/or a storage device.

FIG. 1 depicts an exemplary architecture of a data processing system 100 for data quality exceptions processing. For example, the data processing system 100 may be part of a zEnterprise system of IBM® comprising an IBM DB2 database system.

The data processing system 100 provides an exception engine 101. The exception engine 101 may be a computer system. The components of exception engine 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Exception engine 101 typically includes a variety of computer system readable media. Such media may be any available media that is accessible by computer device 101, and it includes both volatile and non-volatile media, removable and non-removable media.

Exception engine 101 may also communicate with one or more external devices such as a keyboard, a pointing device, a display, etc.; one or more devices that enable a user to interact with exception engine 101; and/or any devices (e.g., network card, modem, etc.) that enable exception engine 101 to communicate with one or more other computing devices. Such communication can occur via I/O interface(s) 119. Still yet, exception engine 101 can communicate with one or more networks such as a local area network (LAN), a general wide area network (WAN), and/or a public network (e.g., the Internet) via network adapter 109. As depicted, network adapter 109 communicates with the other components of computer device 101 via bus 107.

Memory system 105 is configured to store a plurality of applications that are executable on the processor 103. For example, the memory system 105 may comprise an operating system as well as application programs.

The exception engine 101 may be connected to a data source 121. The connection to the data source 121 may be via a wired connection or via a network, which may be a public network, such as the Internet, a private network, such as a wide area network (WAN), or a combination thereof.

The data source 121 may comprise a storage system for storing data sets and/or processing the data sets. The data source 121 may be configured for identifying or detecting data quality exceptions in the data sets stored in the data source 121 and automatically reports the data quality exceptions to the exception engine.

The exception engine 101 may be connected to technical support systems 123A-N. The connection to the technical support systems 123A-N may be via a wired connection or via a network, which may be a public network, such as the Internet, a private network, such as a wide area network (WAN), or a combination thereof.

A technical support system 123A-N may comprise a processing device configured to receive data quality exceptions from the exception engine 101 and to provide technical repairs for the received data quality exceptions. The technical support systems 123A-N have one or more technical tasks. For example, the technical support system 123A may have the technical task of providing technical repairs for data quality exceptions that happened or occurred in a data set of the data source 121 that is located in a predefined location e.g. Nevada.

Memory system 105 may be configured to store a grouping rule 125 for assigning data quality exceptions to exception groups, and associating to each exception group using at least one technical task with a technical support system of the multiple technical support systems 123A-N responsible for providing technical repairs of exceptions in the exception group. For example, the grouping rule 125 may comprise a Boolean expression including one or more Boolean conditions.

Memory system 105 may be configured to store instructions that when executed on the processor 103 may perform at least part of the method described herein.

The operation of the data processing system 100 will be described in details with reference to FIG. 2 and FIG. 3.

Figure 2:
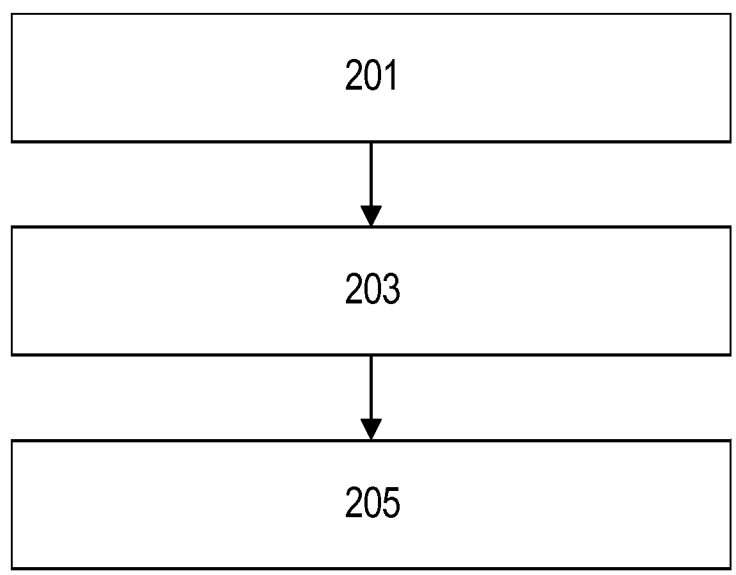
FIG. 2 is a flowchart of a method for processing data quality exceptions.
Figure 3:
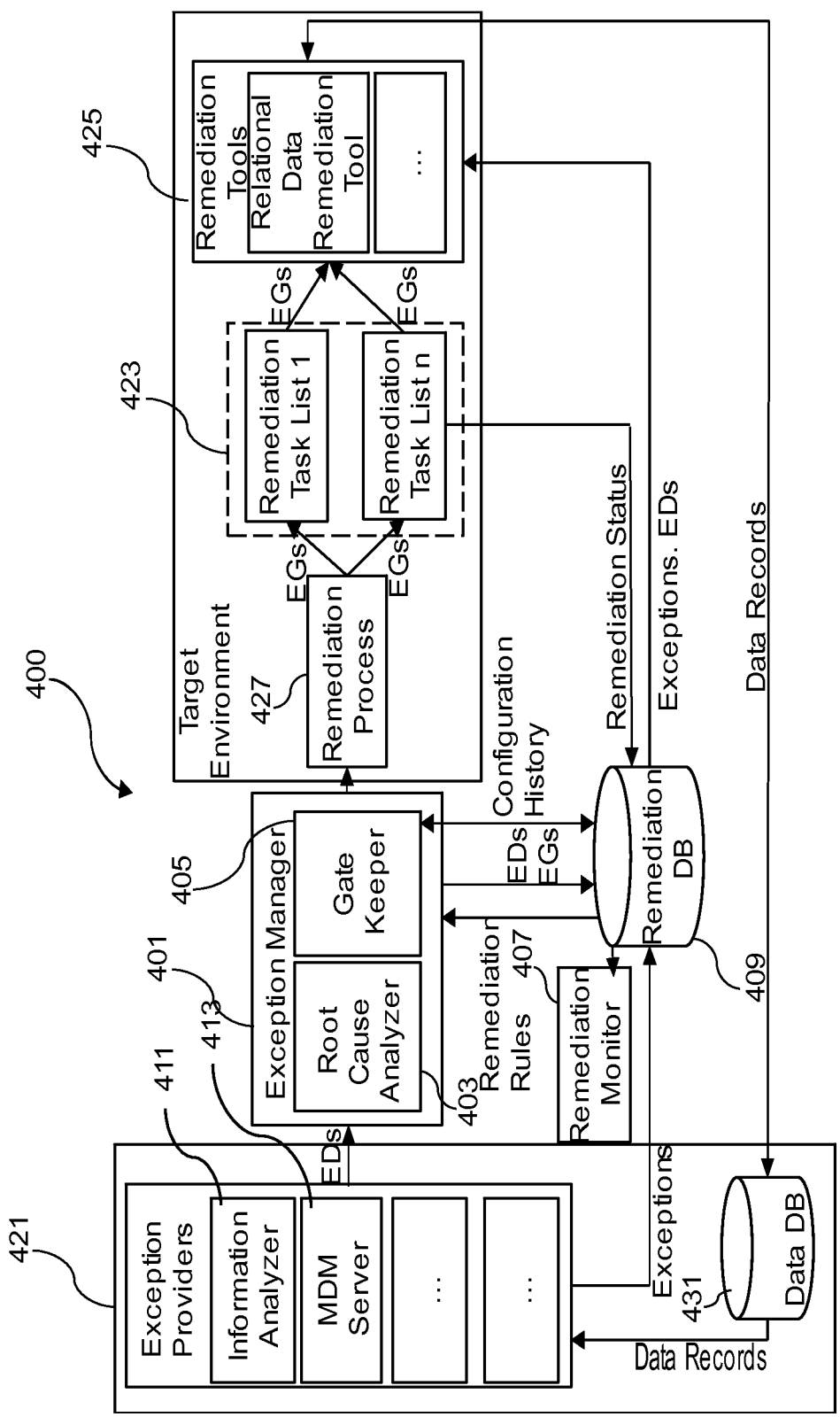
FIG. 3 illustrates a further exemplary data processing system for processing data quality exceptions.

FIG. 2 is a flowchart of a method for processing data quality exceptions in the data processing system 100.

In step 201, the exception engine 101 may receive from the data source 121 a first description of at least a first data quality exception in a data set of the data source. For example, the first description may comprise at least one of an indication of the data set such as an ID indicating the location of the data set in the data source 121, the time at which the first data quality exception occurs in the data source 121 and the amount of data in the data set affected by the first data quality exception. The first description may further comprise an exception detection algorithm that is used by the data source 121 to detect or identify the first data quality exception. For example, in case the first data quality exception indicates a duplicate exception in the data set, the first description may provide the threshold and the condition that has been used by the data source 121 to identify the data quality exception. The threshold may be the maximum number of allowed duplicate in the data set and the condition may be usage of the ">" operator.

The first description may indicate exception attribute values describing the first data quality exception. For example, an attribute such as "duplicate" ("invalid" and/or "missing") that may have value 1 to indicate that there is a duplicate (invalid or missing values) exception in the data set.

The first description may be received as a computer file and/or a data table.

In step 203, the exception engine 101 may use the grouping rule (or apply the grouping rule on at least part of the first description e.g. a condition like 'if "duplicate"==1') for assigning the first data quality exception to at least a first exception group using the first description, and for associating using a first technical task of the one or more technical tasks the first exception group with a first technical support system of the multiple technical support systems 123A-N. The associating may be performed taking into account the one or more technical tasks of the technical support systems 123A-N such that a description of the first exception group can be routed to one of the technical support systems 123A-N for providing technical repairs of exceptions in the first exception group.

For example, the technical support system 123A may have the technical task of providing technical repairs for software related exceptions in the data set, while the technical support systems 123B and 123C may have the technical task of providing technical repairs for data quality exceptions related to the content of the data set, and the technical support systems 123D-G may have the technical task of providing technical repairs for data quality exceptions that occur in a predefined location e.g. data quality exceptions that happen in Europe. In case the first data quality exception relates to the size of the data set being stored in Germany e.g. the data set size is too large, the exception engine 101 may assign the first data quality exception an exception group that is comprises location dependent data quality exception category since the exception is not related to software or to the content of the data set. In this case a selected one or more of the technical support systems 123D-G may provide technical repairs for the first exception group i.e. the first data quality exception. A technical support system 123D of the technical support systems 123D-G may be randomly selected or may be selected as being the technical support system having the lowest load compared to the other technical support systems 123E-G.

In step 205, the exception engine 101 may route at least part of the first description to the technical support system e.g. the selected 123D to provide a technical repair for exceptions in the first exception group i.e. for providing technical repairs for at least the first data quality exception.

For example, to determine whether the selected technical support system 123D having the first technical task the exception engine 101 may send a request (e.g. an SQL statement that may comprise SQL WHERE condition on the location of the data set) to the data source 121 for obtaining an indication of first data entries of the data set affected by the first data quality exception and that correspond to the first technical task. For example, the data set affected by the first data quality exception may be split stored over multiple locations e.g. countries and the first data entries may be located or stored in a given location e.g. Europe that corresponds to the first technical task e.g. because the first technical task gives the first technical support system the ability to provide technical repairs for data entries affected by the first data quality exception and stored in Europe. In other terms, the first technical task indicates that the first technical support systems may provide technical repairs for exception occurring on data stored in Europe.

In response to the request, the exception engine 101 may receive a response message indicating the first data entries, wherein the first technical support system has access to the first data entries. For example, if the message indicates the number of first data entries is higher than 0, then the first technical support system may provide technical repairs for the first data quality exception and the routing may thus be performed.

In an alternative example, the associating of the first exception group with the first technical support system is performed using the first description, wherein the first description may comprise an indication of the number of first data entries of the data set affected by the first data quality exception and that correspond to the first technical task. For example, the first description may indicate that the data set comprises N data entries stored in Europe and M data entries stored in Africa. From that information on the number of entries the association of the first exception group may be performed with the first technical support system e.g. being able to provide technical repairs for data stored in Europe.

Figure 4:
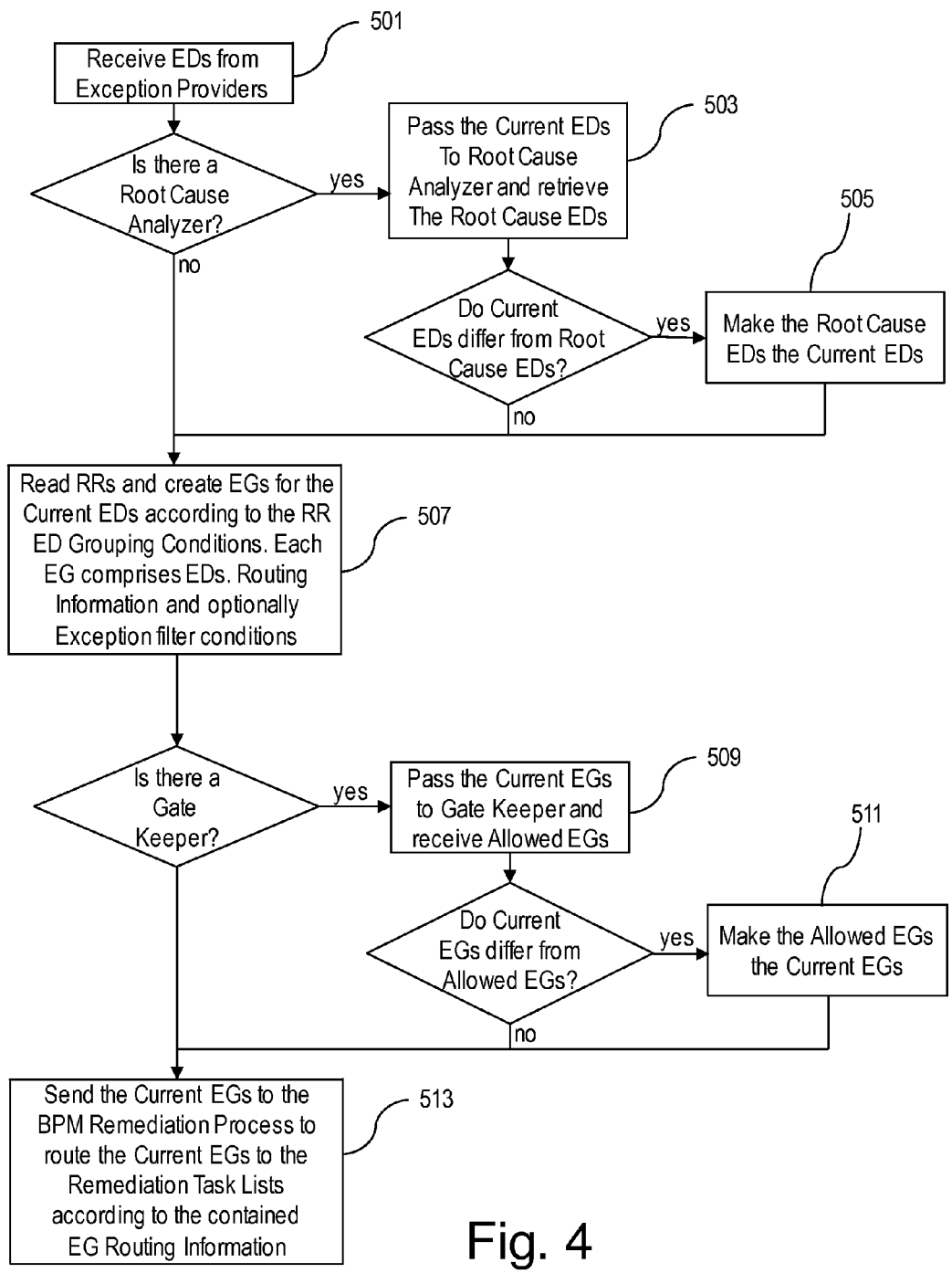
FIG. 4 is a flowchart of a method for processing a root of the data quality exceptions.

The implementation of the present method may be based on the interaction of several components as shown in FIG. 4. FIG. 4 shows a data processing system 400 having a detailed structure of the data processing system 100 of FIG. 1.

The data processing system 400 comprises data source 421 (e.g. as 121) comprising an Exception Provider and a database 431. There are many applications creating or identifying exceptions, for example, in InfoSphere Information Analyzer 411, a data record which does not validate according to a data quality rule is considered an exception. In InfoSphere MDM Server 413, invalid address information or duplicate entries are examples for exceptions. Each of these applications can be an Exception Provider if it provides exception descriptors (EDs) summarizing the identified exceptions through a service interface or a notification mechanism. An ED (e.g. the first description) can contain attributes describing the context of the exceptions (e.g. data source, time etc.) and might either contain a copy of the appropriate unique keys or just represent the data records with an identifier. Instead of data records, an exception may also refer to other artifacts, e.g. data mappings, rules, ETL flows, etc.

The data processing system 400 comprises exception manager 401 (e.g. 101). The exception manager 401 may, for example, be responsible for grouping the exceptions it received from Exception Providers of the data source 421 so that they fit to the organization of the technical support systems 423 which is represented by the Data Support Remediation Task Lists that may indicate the technical task of the technical support system 423. The exception manager 401 may also be responsible for routing of these exception groups (EGs) to the corresponding target environment or technical support system 423 which contains the Remediation Task Lists for further processing. The required grouping and routing may be defined with Remediation Rules. A Remediation Rule (RR) may consist of three parts.

The routing is performed with data processes executed in a processing engine. The exception manager 401 may also observe the exception group status and emits events indicating completely resolved exception groups and exception descriptors. This is important in scenarios that require further processing of the corrected data, for example run an ETL job to upload the corrected data into the target system.

The Exception Manager 401 may optionally comprise a Root Cause Analyzer 403 component and a Gate Keeper component 405. The Root Cause Analyzer 403 is an optional component that may detect root causes for exceptions to avoid a massive amount of exceptions is distributed to the technical support systems 423 for further processing. If detected, only the root cause is sent to the technical support systems 423 instead of the original exceptions.

The Gate Keeper 405 is an optional component that may verify that the number of exceptions in an EG does not exceed the thresholds regarding various exception characteristics, e.g., number of exceptions in EG, number of exceptions in a single ED, number of exceptions in a single data source. If one of the thresholds is exceeded, the gate keeper 405 can block the EG processing and create an appropriate exception.

A plurality of technical support systems form the organizational structure required to process exception groups. For example, if the technical support systems 423 are organized by geographical regions, each Remediation Task List will provide EGs representing exceptions of a specific region for processing. A Remediation Task List can be accessed by system components and maintains the EG remediation status in the Remediation database 409.

If the EGs of an Remediation Task List are processed, a plurality of Remediation Tools 425 can be used by the technical support systems 423 to fix the exceptions which, depending on the exception type, could for example be achieved by correcting data records, rules, data mappings, schema mappings, ETL jobs, . . . , with various Remediation Tools, e.g. Relational Data Editor, InfoSphere Fast Track, Reference Data Management Hub, master data remediation tools.

The data processing system 400 further comprises a Remediation Monitor 407 that may allow creation and storage of reports of the existing EGs and the EG remediation status.

The data processing system 400 further comprises Remediation DB 409 that may provide the persistence model and interfaces to create, update and retrieve Exceptions, EDs, EGs, Remediation Rules and Remediation Status information.

Remediation Rules (i.e. the grouping rule defined above) can be edited and stored in the Remediation database 409 with a Remediation Rules Editor. The remediation rules editor may comprise a graphical user interface (GUI) that allows defining at least the following Remediation Rule parts:

ED Grouping Condition: specifies the ED attribute values (e.g. of the first description) defining an EG. An EG may, for example, contain only the EDs representing exceptions of a specific data source. For example, only exceptions found by the specified application, in the specified data resource will be members of the exception group instances created by these rules.

EG Routing Information: this is either a data process definition to be executed on a processing engine or a link to a remediation process 427 already installed in a processing Engine. If the process requires additional attributes for routing the EGs, e.g., region name or exception kind, these attributes are also defined in the Routing Information.

Exception Filter Condition: this is a data record level filter. For example, a SQL WHERE condition can be specified to select only the data records of a specific geographical region (i.e. a condition on the first technical task that is related to the location containing data for which a technical support system may provide technical repairs).

In addition, a splitting threshold can be specified in a Remediation Rule to limit the number of data records (or other issues) within an EG. The splitting threshold applies only if the EDs directly contain complete issue information, e.g. the data record unique keys. If the number of exceptions in an EG would exceed the splitting threshold, multiple EGs are created by the same Remediation Rule where each EG has only a limited number of exceptions as defined by the splitting threshold.

After receiving EDs from Exception Providers in step 501, the Exception Manager 401 may perform the remaining steps listed in FIG. 5. First, if available, automatic root cause analysis is performed in step 503 to ensure, the exceptions are not created because of a higher level issue which would need a different remediation strategy. For example, one incorrect field mapping could result in many incorrect data values but the mapping issue should be rather corrected instead of correcting each data value. Based on the received EDs, the Root Cause Analyzer 403 detects the root cause and returns appropriate EDs in step 505. It returns either the exact same set of EDs provided as input or a new set of EDs representing the newly detected root cause. The Exception Manager 401 proceeds with the EDs returned by the Root Cause Analyzer 403. In the next step 507, the Exception Manager 401 applies the Remediation Rules to the EDs in order to create the Exception Groups. The ED Grouping Condition defined in the rule and the ED attributes are used to select which ED belongs to an EG. It is ensured by calling the Exception Providers with the filter condition that all EDs without unique keys represent a non-empty set of data records. In addition to the ED references, an EG contains the Routing Information required by the data process defined or linked in the Remediation Rule and the Exception Filter. An EG is created for each Remediation Rule. However, if the EDs directly contain the data record unique keys, a splitting threshold in the Grouping Condition can be used to create multiple EGs based on the same Remediation Rule containing a limited number of unique keys. The created EGs are stored in the Remediation Database 409. If the Gate Keeper 405 component is activated, it is called in the next step 509 to ensure the number of exceptions represented with each EG can be managed by the downstream components. The Gate Keeper 405 returns in step 511 the allowed EGs and creates new Exceptions for the EGs that cannot be processed. Appropriate Remediation Rules and data Processes exist for remediating such Exceptions. In the last step 513, the Exception Manager sends the EGs to the target environment or the technical support systems 423. It starts the data processes defined or linked in the Remediation Rules Routing Information and passes the EGs to the process instances.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. The amount of processing resources may indicate the use degree of each of the physical components such as CPU, memory, and N/W bandwidth included in the computer system and their money cost. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A method for processing data quality exceptions in an online data processing system, the online data processing system having access to one or more online data sources, the online data processing system further having access to multiple online technical support systems for providing technical repairs of the data quality exceptions, the multiple online technical support systems having one or more predefined technical tasks, the method comprising:

providing a predefined grouping rule for assigning data quality exceptions to exception groups, and associating each exception group using at least one technical task of the one or more predefined technical tasks with an online technical support system of the multiple online technical support systems responsible for providing technical repairs of exceptions in the exception group;

receiving, by an exception engine of the data processing system, from at least a first data source of the one or more data sources a first description of at least a first data quality exception in a data set of the first data source;

using the grouping rule for assigning the first data quality exception to at least a first exception group using the first description, and for associating using a first technical task of the one or more technical tasks the first exception group with a first online technical support system of the multiple technical support systems, wherein associating the first exception group with the first online technical support system comprises:

retrieving, from an online repository, a plurality of historical resolution data regarding the first online technical support system, the first technical task, and the first data quality exception;

analyzing the retrieved historical resolution data;

determining, based on the analysis of the retrieved historical resolution data, to send an online request to the online data source;

in response to determining to send an online request to the online data source, sending an online request to the online data source for obtaining an indication of first data entries of the data set affected by the first data quality exception and that correspond to the first technical task; and receiving a response message to the request, the response indicating the first data entries; and routing by the exception engine at least part of the first description to the first online technical support system for providing a technical repair for exceptions in the first exception group.

2. The method of claim 1, wherein associating the first exception group with the first technical support system is performed using the first description, wherein the first description comprises an indication of first data entries of the data set affected by the first data quality exception and that correspond to the first technical task.

3. The method of claim 1, further comprising:
using the grouping rule for assigning the first data quality exception to a second exception group using the first description, and for associating using a second technical task of the one or more technical tasks the second exception group with a second technical support system of the multiple technical support systems;

sending a request to the data source for obtaining an indication of data entries of the data set affected by the first data quality exception and that correspond to the second technical task;

receiving a response indicative of zero entries in response to the request; and preventing routing by the exception engine at least part of the first description to the second technical support system for providing a technical repair for exceptions in the second exception group.

4. The method of claim 1, further comprising before routing:
receiving from a second data source of the data processing system a second description of a second data quality exception in a data set of the second data source; and using the grouping rule for assigning the second data quality exception to the first exception group using the second description, wherein routing comprises routing by the exception engine at least part of the first description and the second description to the first technical support system.

5. The method of claim 1, wherein the grouping rule comprises conditions on at least part of the first description and the first technical task.

6. The method of claim 1, wherein the first description comprises at least one of: an indication of the data set; the time at which the first data quality exception occurs in the first data source; the amount of data in the data set affected by the first data quality exception; an exception detection algorithm that is used to detect the first data quality exception; a data type of the data set; a technical description of the first data quality exception; and an indication of the last modification time in the data set.

7. The method of claim 1, further comprising before routing:
receiving from a second data source of the processing system a second description of at least a second data quality exception in a data set of the second data source, wherein the first and second descriptions indicate first and second exceptions attribute values describing the first and second data quality exceptions respectively;

using the grouping rule for assigning the second data quality exception to the first exception group using the second description;

evaluating the first and second exception attribute values and therefrom determining a dependency exception attribute relating the first and second exception attributes;

determining a root data quality exception associated with the dependency exception attribute; and providing a description of the root data quality exception using the first and second descriptions, wherein routing comprises routing by the exception engine at least part of the description to the first technical support system for providing a technical repair for the root data quality exception, thereby providing the technical repair for the first and second data quality exceptions.

8. The method of claim 1, further comprising:
determining the number of first data entries of the data set affected by the first data quality exception;

determining that the number of first data entries is higher than a predetermined maximum number of entries;

splitting the first exception group into at least two exception sub-groups; and associating using the first technical task the at least two exception sub-groups with at least the first technical support system; and generating a description for each of the at least two exception sub-groups;

routing the descriptions to at least the first technical support system for providing a technical repair for the at least two exception sub-groups.

9. The method of claim 1, wherein the routing is repeated at a predefined time interval.

10. The method of claim 1, wherein each of the first data source and the first technical support system comprises an end-host system of a network of the data processing system.

11. A computer program product for processing data quality exceptions in an online data processing system, the online data processing system having access to one or more online data sources, the online data processing system further having access to multiple online technical support systems for providing technical repairs of the data quality exceptions, the multiple online technical support systems having one or more predefined technical tasks, the computer program product comprising:
  one or more non-transitory computer-readable storage devices and program instructions stored on at least one of the one or more non-transitory tangible storage devices, the program instructions executable by a processor, the program instructions comprising:
  program instructions to provide a predefined grouping rule for assigning data quality exceptions to exception groups, and associating each exception group using at least one technical task of the one or more predefined technical tasks with an online technical support system of the multiple online technical support systems responsible for providing technical repairs of exceptions in the exception group;
  program instructions to receive, by an exception engine of the data processing system, from at least a first data source of the one or more data sources a first description of at least a first data quality exception in a data set of the first data source;
  program instructions to use the grouping rule for assigning the first data quality exception to at least a first exception group using the first description, and for associating using a first technical task of the one or more technical tasks the first exception group with a first online technical support system of the multiple technical support systems, wherein associating the first exception group with the first online technical support system comprises:
    program instructions to retrieve, from an online repository, a plurality of historical resolution data regarding the first online technical support system, the first technical task, and the first data quality exception;
    program instructions to analyze the retrieved historical resolution data;
    program instructions to determine, based on the analysis of the retrieved historical resolution data, to send an online request to the online data source;
    in response to determining to send an online request to the online data source, program instructions to send an online request to the online data source for obtaining an indication of first data entries of the data set affected by the first data quality exception and that correspond to the first technical task; and
    program instructions to receive a response message to the request, the response indicating the first data entries; and
  program instructions to route by the exception engine at least part of the first description to the first technical support system for providing a technical repair for exceptions in the first exception group.

12. The computer program product of claim 11, wherein associating the first exception group with the first technical support system is performed using the first description, wherein the first description comprises an indication of first data entries of the data set affected by the first data quality exception and that correspond to the first technical task.

13. The computer program product of claim 11, further comprising:

program instructions to use the grouping rule for assigning the first data quality exception to a second exception group using the first description, and for associating using a second technical task of the one or more technical tasks the second exception group with a second technical support system of the multiple technical support systems;
program instructions to send a request to the data source for obtaining an indication of data entries of the data set affected by the first data quality exception and that correspond to the second technical task;
program instructions to receive a response indicative of zero entries in response to the request; and
program instructions to prevent routing by the exception engine at least part of the first description to the second technical support system for providing a technical repair for exceptions in the second exception group.

14. The computer program product of claim 11, further comprising before routing:
  program instructions to receive from a second data source of the data processing system a second description of a second data quality exception in a data set of the second data source; and
  program instructions to use the grouping rule for assigning the second data quality exception to the first exception group using the second description, wherein routing comprises routing by the exception engine at least part of the first description and the second description to the first technical support system.

15. The computer program product of claim 11, wherein the grouping rule comprises conditions on at least part of the first description and the first technical task.

16. The computer program product of claim 11, wherein the first description comprises at least one of: an indication of the data set; the time at which the first data quality exception occurs in the first data source; the amount of data in the data set affected by the first data quality exception; an exception detection algorithm that is used to detect the first data quality exception; a data type of the data set; a technical description of the first data quality exception; and an indication of the last modification time in the data set.

17. The computer program product of claim 11, further comprising before routing:
  program instructions to receive from a second data source of the processing system a second description of at least a second data quality exception in a data set of the second data source, wherein the first and second descriptions indicate first and second exceptions attribute values describing the first and second data quality exceptions respectively;
  program instructions to use the grouping rule for assigning the second data quality exception to the first exception group using the second description;
  program instructions to evaluate the first and second exception attribute values and therefrom determining a dependency exception attribute relating the first and second exception attributes;
  program instructions to determine a root data quality exception associated with the dependency exception attribute; and
  program instructions to provide a description of the root data quality exception using the first and second descriptions, wherein routing comprises routing by the exception engine at least part of the description to the first technical support system for providing a technical repair for the root data quality exception, thereby providing the technical repair for the first and second data quality exceptions.

18. A computer system for processing data quality exceptions in an online data processing system, the online data processing system having access to one or more online data sources, the online data processing system further having access to multiple online technical support systems for providing technical repairs of the data quality exceptions, the multiple online technical support systems having one or more predefined technical tasks, wherein a predefined grouping rule is provided for assigning data quality exceptions to exception groups, and associating to each exception group using at least one technical task of the one or more predefined technical tasks with an online technical support system of the multiple online technical support systems responsible for providing technical repairs of exceptions in the exception group, the computer system comprising:

one or more processors, one or more computer-readable memories, one or more non-transitory computer-readable tangible storage devices, and program instructions stored on at least one of the one or more non-transitory storage devices for execution by at least one of the one or more processors via at least one of the one or more memories, wherein the computer system is capable of performing a method comprising:

receiving from at least a first data source of the one or more data sources a first description of at least a first data quality exception in a data set of the first data source;

using the grouping rule for assigning the first data quality exception to at least a first exception group using the first description, and for associating using a first technical task of the one or more technical tasks the first exception group with a first online technical support system of the multiple technical support systems, wherein associating the first exception group with the first online technical support system comprises:

retrieving, from an online repository, a plurality of historical resolution data regarding the first online technical support system, the first technical task, and the first data quality exception;

analyzing the retrieved historical resolution data;

determining, based on the analysis of the retrieved historical resolution data, to send an online request to the online data source;

in response to determining to send an online request to the online data source, sending an online request to the online data source for obtaining an indication of first data entries of the data set affected by the first data quality exception and that correspond to the first technical task; and receiving a response message to the request, the response indicating the first data entries; and routing at least part of the first description to the first technical support system for providing a technical repair for exceptions in the first exception group.

* * * * *